United States Patent
Onimaru et al.

(10) Patent No.: US 12,157,486 B2
(45) Date of Patent: Dec. 3, 2024

(54) ROAD SURFACE EVALUATION APPARATUS

(71) Applicant: Honda Motor Co., Ltd., Tokyo (JP)

(72) Inventors: Hiroyuki Onimaru, Tokyo (JP); Takeo Tokunaga, Tokyo (JP); Atsuki Kakinuma, Tokyo (JP); Yasuo Oishi, Tokyo (JP); Akira Lihoshi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/088,064

(22) Filed: Dec. 23, 2022

(65) Prior Publication Data

US 2023/0202501 A1 Jun. 29, 2023

(30) Foreign Application Priority Data

Dec. 28, 2021 (JP) .................................. 2021-213572

(51) Int. Cl.
*B60W 50/14* (2020.01)
*B60W 40/06* (2012.01)

(52) U.S. Cl.
CPC ............ *B60W 50/14* (2013.01); *B60W 40/06* (2013.01); *B60W 2050/146* (2013.01); *B60W 2552/35* (2020.02); *B60W 2556/20* (2020.02); *B60W 2556/40* (2020.02); *B60W 2556/65* (2020.02)

(58) Field of Classification Search
CPC .. B60W 50/14; B60W 40/06; B60W 2552/35; B60W 2556/40; B60W 2556/20; B60W 2556/65; B60W 2050/146
USPC ...................................................... 340/425.5
See application file for complete search history.

(56) References Cited

U.S. PATENT DOCUMENTS

2020/0284591 A1* 9/2020 Shapira ................ G05D 1/0285
2021/0138959 A1* 5/2021 Soni .......................... G08G 1/16

FOREIGN PATENT DOCUMENTS

| JP | 11025389 | A | * | 1/1999 | |
|---|---|---|---|---|---|
| JP | H1125389 | A | | 1/1999 | |
| JP | 2002012138 | A | | 1/2002 | |
| JP | 2013079889 | A | * | 5/2013 | |
| JP | 2016057861 | A | * | 4/2016 | |
| JP | 2020013537 | A | * | 1/2020 | ............ B60W 40/06 |

OTHER PUBLICATIONS

Japanese office action; Application 2021213572; Jun. 6, 2023.

* cited by examiner

*Primary Examiner* — Naomi J Small
(74) *Attorney, Agent, or Firm* — Duft & Bornsen, PC

(57) ABSTRACT

A road surface evaluation apparatus includes a microprocessor configured to perform: acquiring driving information of each of a plurality of vehicles, including a position and an acceleration of each of the plurality of vehicles while traveling, and a map information including road information on a road where the plurality of vehicles travel; evaluating a surface roughness of the road based on accelerations of the plurality of vehicles acquired in the acquiring within a predetermined period and, when a degree of accumulation of the accelerations of the plurality of vehicles acquired within the predetermined period is less than a predetermined value, evaluating the surface roughness by complementing the acceleration of the plurality of vehicles acquired before the predetermined period; and outputting information on the surface roughness evaluated in the evaluating in association with the road information acquired in the acquiring.

10 Claims, 13 Drawing Sheets

FIG. 11

| MODEL | GRADE | SUSPENSION | | TIRE | |
|---|---|---|---|---|---|
| | | TYPE | CORRECTION FACTOR | TYPE | CORRECTION FACTOR |
| ABC | HIGH | SS_11 | $\alpha 11$ | tr_11 | $\beta 11$ |
| | STANDARD | SS_12 | $\alpha 12$ | tr_12 | $\beta 12$ |
| | LOW | SS_13 | $\alpha 13$ | tr_13 | $\beta 13$ |
| XYZ | HIGH | SS_21 | $\alpha 21$ | tr_21 | $\beta 21$ |

ROAD SURFACE EVALUATION APPARATUS

CROSS-REFERENCE TO RELATED APPLICATION

This application is based upon and claims the benefit of priority from Japanese Patent Application No. 2021-213572 filed on Dec. 28, 2021, the content of which are incorporated herein by reference.

BACKGROUND OF THE INVENTION

Field of the Invention

This invention relates to a road surface evaluation apparatus for evaluating a road surface profile representing unevenness of a road surface.

Description of the Related Art

As a prior-art apparatus of this type, it is known that a road surface profile representing the unevenness of the road surface on which a vehicle has traveled is detected based on the acceleration measured by an acceleration sensor installed in the vehicle (see, for example, JP 2002-12138 A).

However, the method of evaluating road surface profiles with the device described in JP 2002-12138 described above requires a dedicated vehicle equipped with the device to be traveled on the road in order to detect the road surface profile, and the road surface profile cannot be easily evaluated.

SUMMARY OF THE INVENTION

An aspect of the present invention is a road surface evaluation apparatus including a microprocessor and a memory connected to the microprocessor. The microprocessor is configured to perform: acquiring driving information of each of a plurality of vehicles, including a position and an acceleration of each of the plurality of vehicles while traveling, and a map information including road information on a road where the plurality of vehicles travel; evaluating a surface roughness of the road based on accelerations of the plurality of vehicles acquired in the acquiring within a predetermined period and, when a degree of accumulation of the accelerations of the plurality of vehicles acquired within the predetermined period is less than a predetermined value, evaluating the surface roughness by complementing the acceleration of the plurality of vehicles acquired before the predetermined period; and outputting information on the surface roughness evaluated in the evaluating in association with the road information acquired in the acquiring.

BRIEF DESCRIPTION OF THE DRAWINGS

The objects, features, and advantages of the present invention will become clearer from the following description of embodiments in relation to the attached drawings, in which:

FIG. 11 is a diagram showing an example of a correction coefficient table;

DETAILED DESCRIPTION OF THE INVENTION

Figure 1:
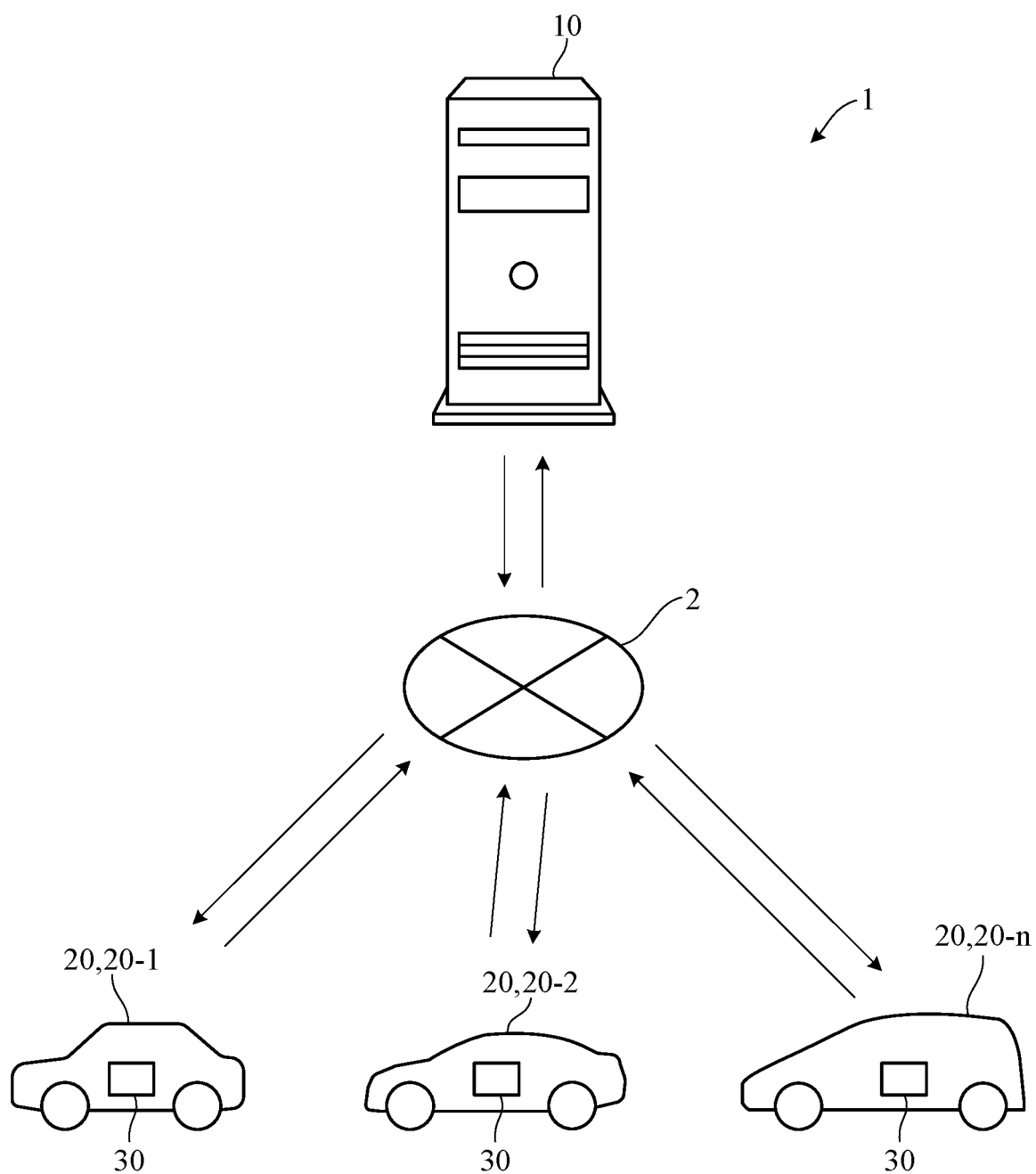
FIG. 1 is a diagram showing an example of the configuration of a road surface evaluation system including a road surface evaluation apparatus according to an embodiment of the present invention.

A description will be given below of an embodiment of the present invention with reference to FIGS. 1 to 12B. The road surface evaluation apparatus according to the present embodiment is a device for evaluating the road surface profile of a road on which vehicles are traveling. FIG. 1 illustrates an example of the configuration of a road surface evaluation system including a road surface evaluation apparatus according to the present embodiment. As illustrated in FIG. 1, the road surface evaluation system 1 includes a road surface evaluation apparatus 10 and in-vehicle terminals 30. The road surface evaluation apparatus 10 includes, for example, a server device. The in-vehicle terminals 30 are configured to communicate with the road surface evaluation apparatus 10 via a communication network 2.

The communication network 2 includes not only public wireless communication networks represented by Internet networks and cell phone networks, but also closed communication networks established for each predetermined administrative region, such as wireless LAN, Wi-Fi (registered trademark), and Bluetooth (registered trademark).

The in-vehicle terminals 30 are mounted on vehicles 20. The vehicles 20 include a plurality of vehicles 20-1, 20-2, . . . , and 20-*n*. The vehicles 20 may be manual driving vehicles or self-driving vehicles. The vehicles 20 may include vehicles of different models and grades.

Figure 2:
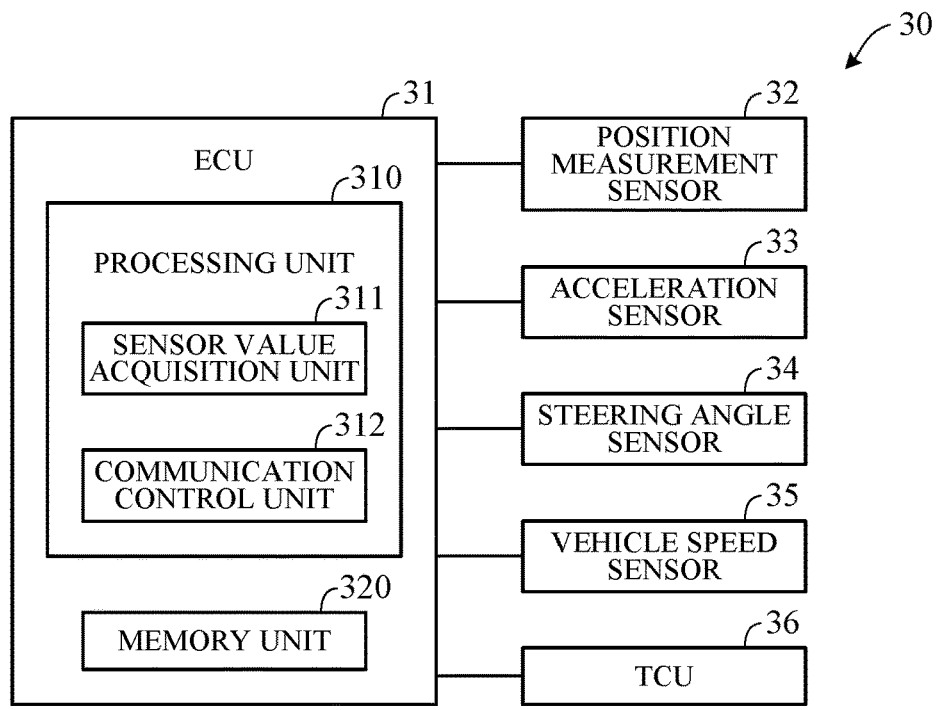
FIG. 2 is a block diagram illustrating key components of an in-vehicle terminal according to the embodiment of the present invention.

FIG. 2 is a block diagram illustrating the key components of the in-vehicle terminal 30 according to the present embodiment. The in-vehicle terminal 30 includes an electronic control unit (ECU) 31, a position measurement sensor 32, an acceleration sensor 33, a steering angle sensor 34, a vehicle speed sensor 35, and a telematic control unit (TCU) 36.

The position measurement sensor 32 is, for example, a GPS sensor, which receives positioning signals transmitted from GPS satellites and detects the absolute position (e.g., latitude and longitude) of the vehicle 20. The position measurement sensor 32 includes not only GPS sensors but also sensors that use radio waves transmitted from satellites in various countries, known as GNSS satellites, including quasi-zenith orbit satellites.

The acceleration sensor 33 detects the acceleration of the vehicle 20 in the left-right directions, that is, lateral acceleration. The acceleration sensor 33 may be configured to detect acceleration in the front-back direction and vertical direction as well as lateral acceleration of the vehicle 20. The steering angle sensor 34 detects the steering angle of the steering wheel (not illustrated) of the vehicle 20. The vehicle speed sensor 35 detects the vehicle speed of the vehicle 20.

As illustrated in FIG. 2, the ECU 31 includes a computer including a processing unit 310 such as a CPU, a memory unit 320 such as ROM and RAM, and other peripheral circuits such as I/O interfaces not illustrated. The processing unit 310 functions as a sensor value acquisition unit 311 and a communication control unit 312 by executing a program stored in the memory unit 320 in advance.

The sensor value acquisition unit 311 acquires the detected values of the sensors 33 to 35 and the absolute position of the vehicle 20 detected by the position measurement sensor 32 at a predetermined sampling period, for example at 1 Hz (every 1 s). The communication control unit 312 transmits the information acquired by the sensor value acquisition unit 311 (hereinafter referred to as driving information) to the road surface evaluation apparatus 10 at a predetermined period via the TCU 36, together with the detection time information indicating the detection time thereof and the vehicle ID that can identify the vehicle 20.

The road surface evaluation apparatus 10 detects the unevenness of the road surface, that is, the road surface roughness (hereinafter also referred to as a road surface profile), based on the detected values of the acceleration sensors 33 of the vehicles 20 (in-vehicle terminals 30). The detected road surface profile information is output to, for example, a terminal owned by a road management company or the like, and is used as reference data by the road management company when considering whether or not repairs are necessary. Specifically, the detected values of the acceleration sensor are used to evaluate the road surface profile.

Figure 3:
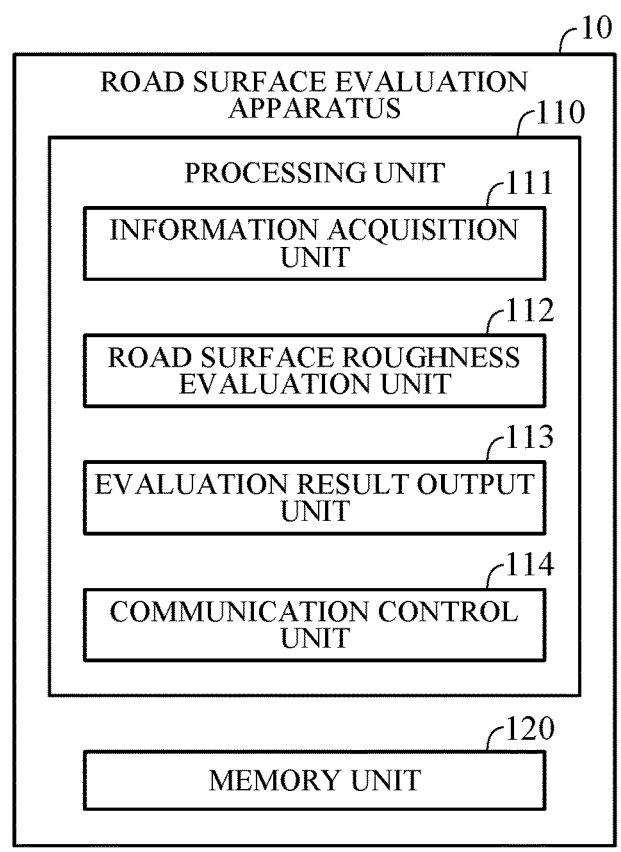
FIG. 3 is a block diagram illustrating key components of the road surface evaluation apparatus according to the embodiment of the present invention.

FIG. 3 is a block diagram illustrating the key components of the road surface evaluation apparatus 10 according to the present embodiment. The road surface evaluation apparatus 10 is configured to include a computer including a processing unit 110, such as a CPU, a memory unit 120 such as ROM and RAM, and other peripheral circuits such as I/O interfaces not illustrated. The memory unit 120 stores map information including road maps, and various information processed by the processing unit 110.

The processing unit 110 functions as an information acquisition unit 111, a road surface roughness evaluation unit 112, an evaluation result output unit 113, and a communication control unit 114 by executing programs stored in the memory unit 120.

The information acquisition unit 111 receives driving information from the in-vehicle terminals 30 of the plurality of vehicles 20 traveling on the road via the communication control unit 114. The information acquisition unit 111 can identify the vehicles 20 from which the driving information is transmitted by the vehicle ID associated with the driving information.

The information acquisition unit 111 stores driving information received from the plurality of vehicles 20 (in-vehicle terminals 30) in the memory unit 120 in time series. Hereafter, the driving information stored in time series in the memory unit 120 is referred to as time-series driving information. The information acquisition unit 111 also acquires map information from the memory unit 120, including information on the road on which the vehicles 20 are traveling.

The road surface roughness evaluation unit 112 evaluates the amount of unevenness (depth or height) of the road surface, or road surface roughness, based on the driving information of the plurality of vehicles 20 acquired by the information acquisition unit 111 within a predetermined period. More specifically, the road surface roughness evaluation unit 112 derives a road surface roughness value indicating the degree of road surface roughness based on the lateral accelerations of the plurality of vehicles 20 acquired by the information acquisition unit 111 within a predetermined period. The road surface roughness value is, for example, a value expressed in terms of the International Roughness Index (IRI), which is an international index. Hereinafter, the road surface roughness values may be simply referred to as roughness values.

Figure 4A:
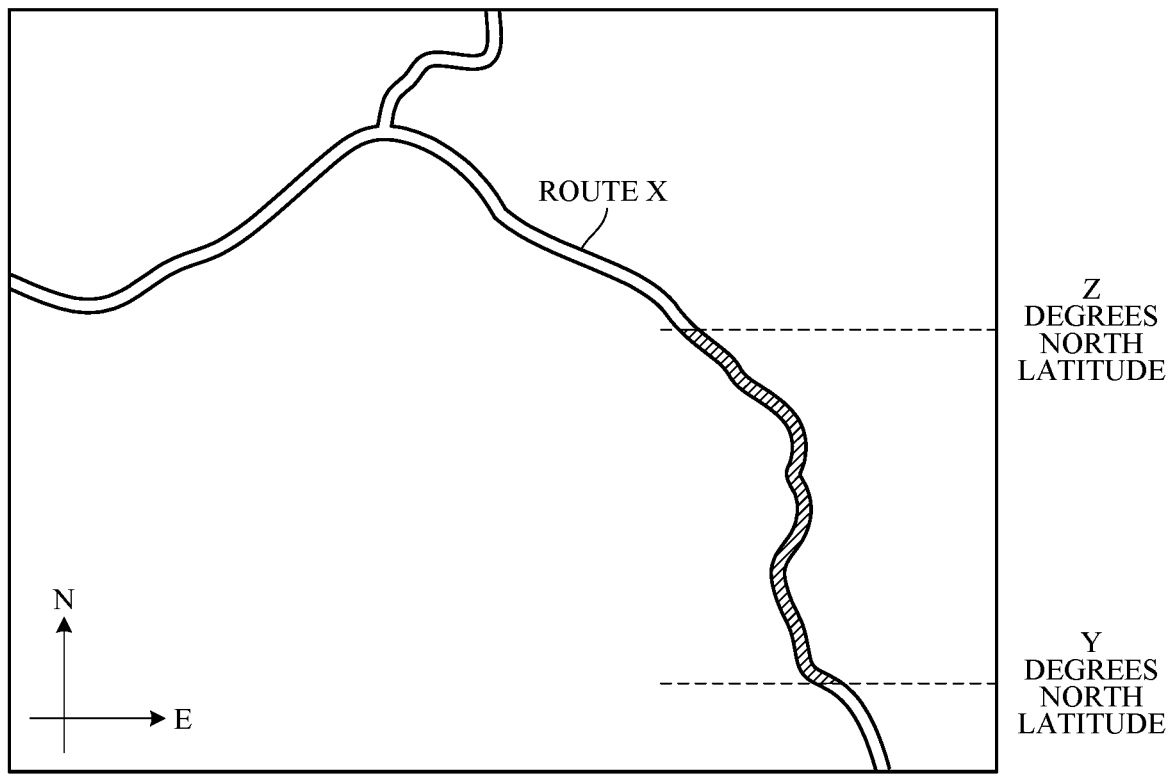
FIG. 4A is a diagram showing an example of a map of a road on which vehicles are traveling.

FIG. 4A illustrates an example of a map of the road on which the vehicles 20 are traveling. FIG. 4A illustrates the predetermined range of road surface roughness to be evaluated (latitude Y to Z on National Route X). In FIG. 4A, the upper direction corresponds to the north direction, and the right direction corresponds to the east direction. The range of road surface roughness to be evaluated (hereinafter referred to as the road to be evaluated) can be specified by the user as described later. In a case where the road to be evaluated has a plurality of lanes on each side, the user may be able to specify the lane to be evaluated for road surface roughness.

Figure 4B:
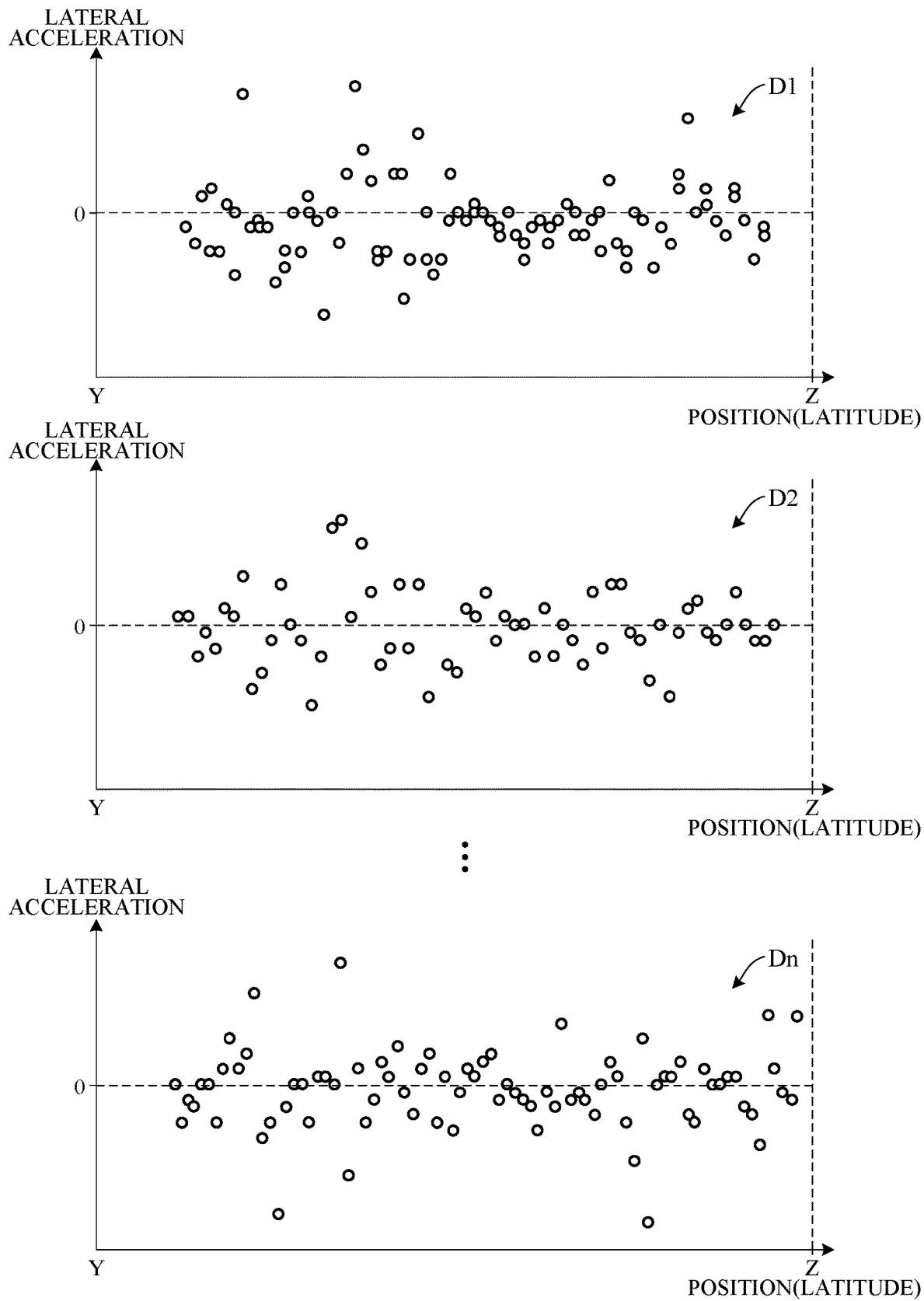
FIG. 4B is a diagram showing an example of driving information obtained by the road surface evaluation apparatus from the vehicles traveling on the road in FIG. 4A.

The driving information acquired at a predetermined sampling period (1 Hz in the present embodiment) by the in-vehicle terminal 30 is transmitted to the road surface evaluation apparatus 10 via the communication control unit 312. The driving information includes at least the information on the lateral acceleration of the vehicle 20 detected by the acceleration sensor 33 at the time of sampling (hereinafter referred to as acceleration information) and the absolute position of the vehicles 20 detected by the position measurement sensor 32 at the time of sampling (hereinafter referred to as position information). FIG. 4B illustrates an example of time-series driving information obtained by the road surface evaluation apparatus 10 from the in-vehicle terminals 30 of a plurality of vehicles 20 traveling in the predetermined range (latitude Y to Z on National Route X) in FIG. 4A. The horizontal axis in the figure is the position (latitude) of the vehicles 20 in the traveling direction along the traveling lane, and the vertical axis is the lateral acceleration of the vehicles 20. Characteristics D1, D2, . . . , Dn represent the time-series driving information of the vehicles 20-1, 20-2, . . . , 20-n, respectively.

Increasing the above sampling period improves the accuracy of the road surface roughness value derived by the road surface roughness evaluation unit 112, allowing accurate evaluation of the road surface profile. However, a high sampling period (for example, 100 Hz) of driving information increases the processing load of the in-vehicle terminal

30. Furthermore, it increases the data volume of driving information transmitted to the road surface evaluation apparatus 10, which may put pressure on the bandwidth of the communication network 2. Therefore, in consideration of this point, in the present embodiment, the first sampling period (1 Hz) of driving information transmitted from n vehicles 20 is combined to generate the second sampling period (1×n Hz) of composite driving information, and the road surface roughness value is derived based on the composite driving information. Here, generation of the composite driving information will be described with reference to FIG. 5.

Figure 5:
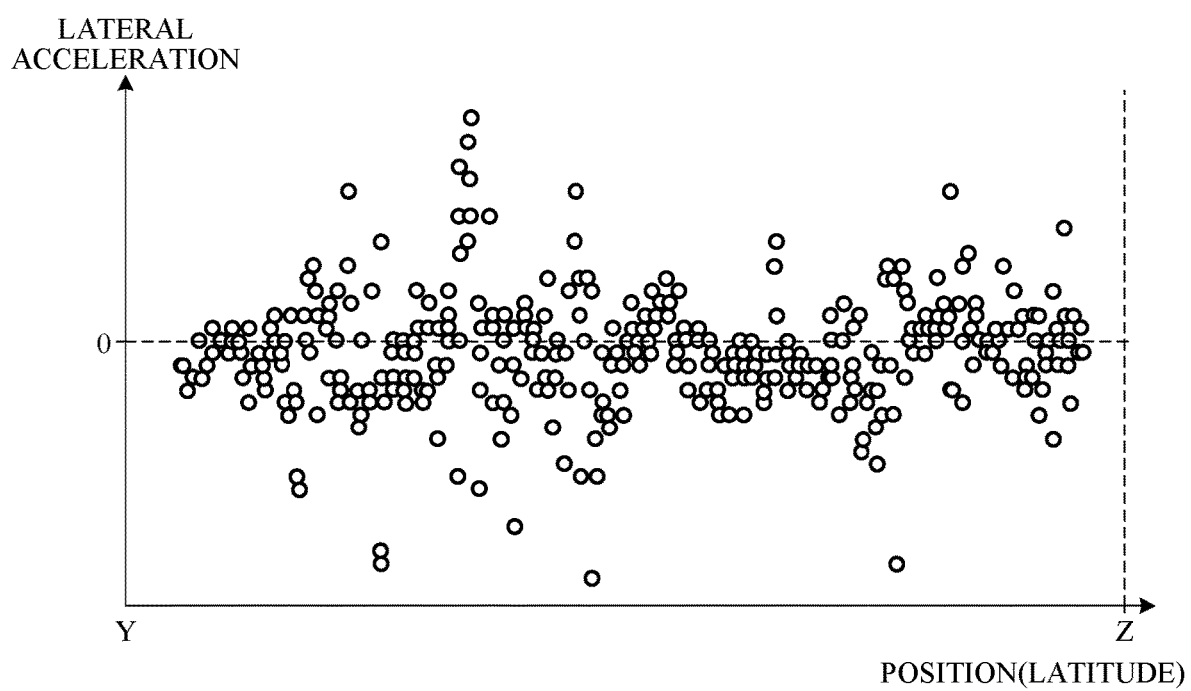
FIG. 5 is a diagram showing an example of composite driving information.

FIG. 5 illustrates an example of composite driving information generated based on driving information acquired from the in-vehicle terminals 30 of the plurality of vehicles 20 traveling on the road in FIG. 4A. The composite driving information is the information of the driving information of the vehicles 20 combined based on the position information of the vehicles 20. The composite driving information illustrated in FIG. 5 is acquired by superimposing the values of the vertical axis (lateral acceleration) for the vehicles 20 illustrated in FIG. 4B with reference to the horizontal axis (latitude). Since the vehicle speeds of the vehicles 20 and the points at which the vehicles 20 start sampling are different, the timing at which the driving information is sampled is considered to be different for each of the vehicles 20, even if the sampling period of the driving information for the vehicles 20 is the same. Therefore, by combining the 1 Hz driving information sampled in n vehicles 20 as described above, driving information equivalent to 1×n Hz is acquired. The road surface roughness evaluation unit 112 evaluates the surface roughness of the road on which the vehicles 20 are traveling based on the composite driving information acquired in this manner.

In general, the greater the amount of unevenness of the road surface, the greater the lateral acceleration of the vehicle 20, and the road surface roughness value and lateral acceleration have a certain correlation. The road surface roughness evaluation unit 112 uses this correlation information (hereafter referred to as correlation data) to derive a road surface roughness value corresponding to the vehicle position on the road from the lateral acceleration.

Figure 6A:
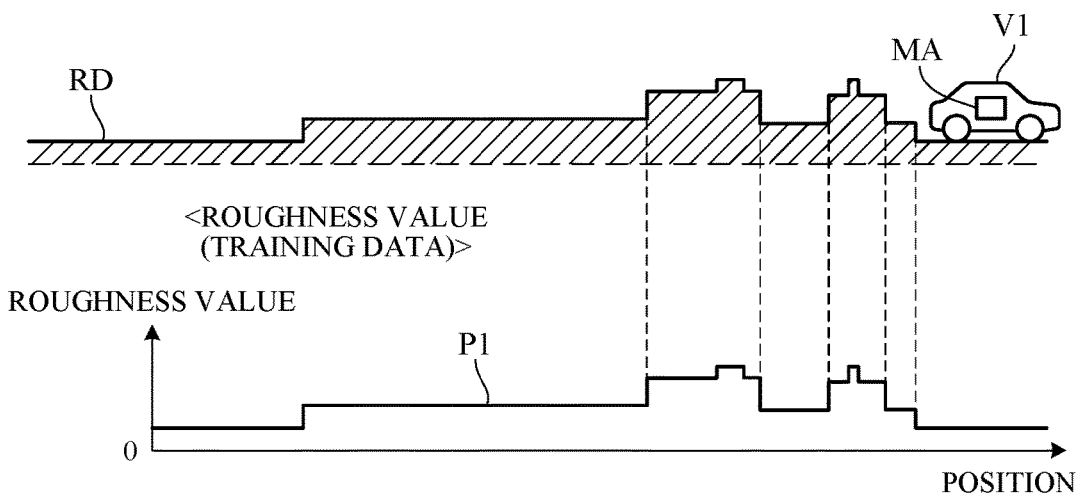
FIG. 6A is a diagram for explaining training data for road surface roughness values and lateral acceleration.
Figure 6B:
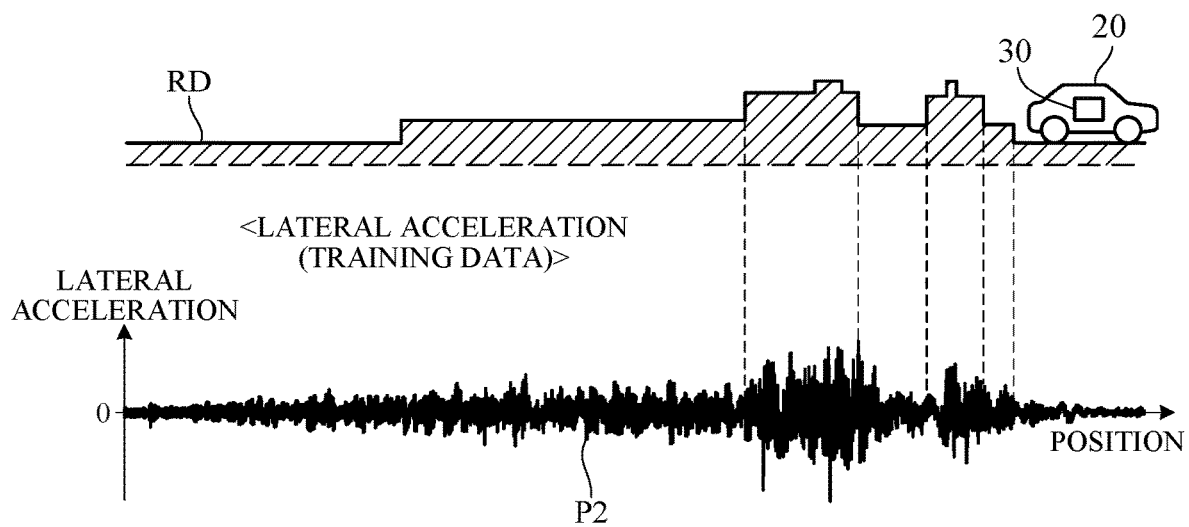
FIG. 6B is a diagram for explaining training data for lateral acceleration.

First, the road surface roughness evaluation unit 112 performs machine learning using pre-measured road surface roughness values and lateral acceleration as teacher data to derive the correlation between road surface roughness values and lateral acceleration. FIGS. 6A and 6B illustrate the teacher data for road surface roughness values and lateral acceleration, respectively. A vehicle V1 illustrated in FIG. 6A is a dedicated vehicle including a measuring instrument MA that measures road surface roughness. The measuring instrument MA measures the road surface roughness values of the road RD when the vehicle V1 is traveling on a predetermined road (such as a course for measurement) RD. A characteristic P1 in FIG. 6A represents the road surface roughness value measured at this time, that is, the road surface roughness value used as the teacher data.

FIG. 6B illustrates the vehicles 20 in FIG. 1 traveling on the same road RD as that in FIG. 6A. A characteristic P2 in FIG. 6B represents the lateral acceleration detected by the acceleration sensors 33 installed in the vehicles 20 while the vehicles 20 are traveling on a predetermined road RD, that is, the lateral acceleration used as the teacher data.

The teacher data for road surface roughness values and lateral acceleration may be stored in the memory unit 120 of the road surface evaluation apparatus 10 or in an external storage device. The road surface roughness evaluation unit 112 performs machine learning using the road surface roughness values and lateral acceleration teacher data read from the memory unit 120 or an external storage device to derive the correlation between the road surface roughness values and lateral acceleration. The traveling speed, front/rear acceleration, and steering angle may be added as teacher data for machine learning.

The road surface roughness evaluation unit 112 derives road surface roughness values for roads on which the plurality of vehicles 20 traveled based on the derived correlation between the road surface roughness values and lateral acceleration and the composite driving information.

Figure 7:
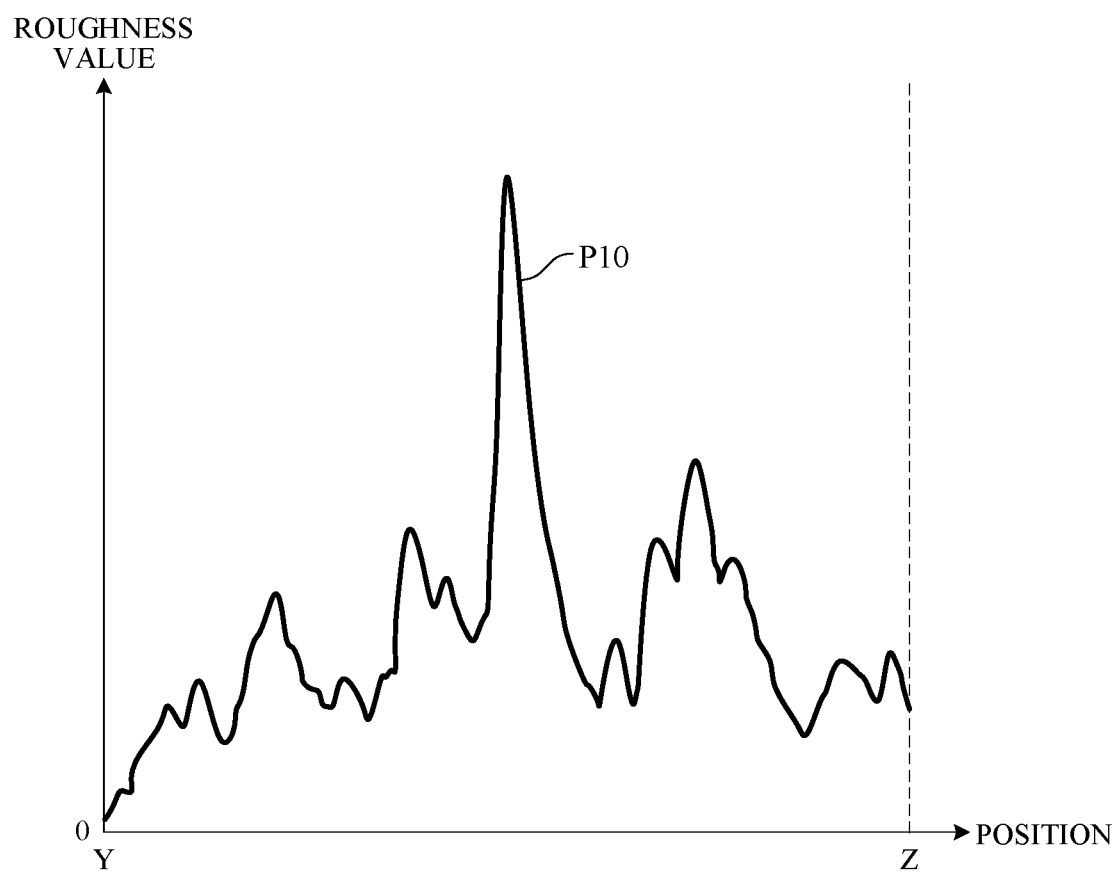
FIG. 7 is a diagram showing an example of road surface profile information.

The evaluation result output unit 113 generates road surface profile information that associates the road surface roughness information, or road surface roughness value, evaluated by the road surface roughness evaluation unit 112 with the road information acquired by the information acquisition unit 111, and outputs the generated road surface profile information. FIG. 7 illustrates an example of the road surface profile information. A characteristic P10 in the figure represents the road surface roughness value derived based on the composite driving information illustrated in FIG. 5. The horizontal axis is the position (latitude) of the vehicle 20 in the traveling direction along the traveling lane, and the vertical axis is the road surface roughness value. When receiving a road surface profile output instruction from a terminal of a road management company or the like via the communication network 2, the evaluation result output unit 113 outputs the road surface profile information to the terminal from which the output instruction was transmitted or to a predetermined output destination terminal. The road surface profile output instruction may be input to the road surface evaluation apparatus 10 via a control unit (not illustrated) included in the road surface evaluation apparatus 10. The road surface profile information is information that can be displayed on a display device such as a display, and the user (for example, a road management company) can check the road surface profile by displaying the road surface profile information on the display included in the user's terminal.

Figure 8:
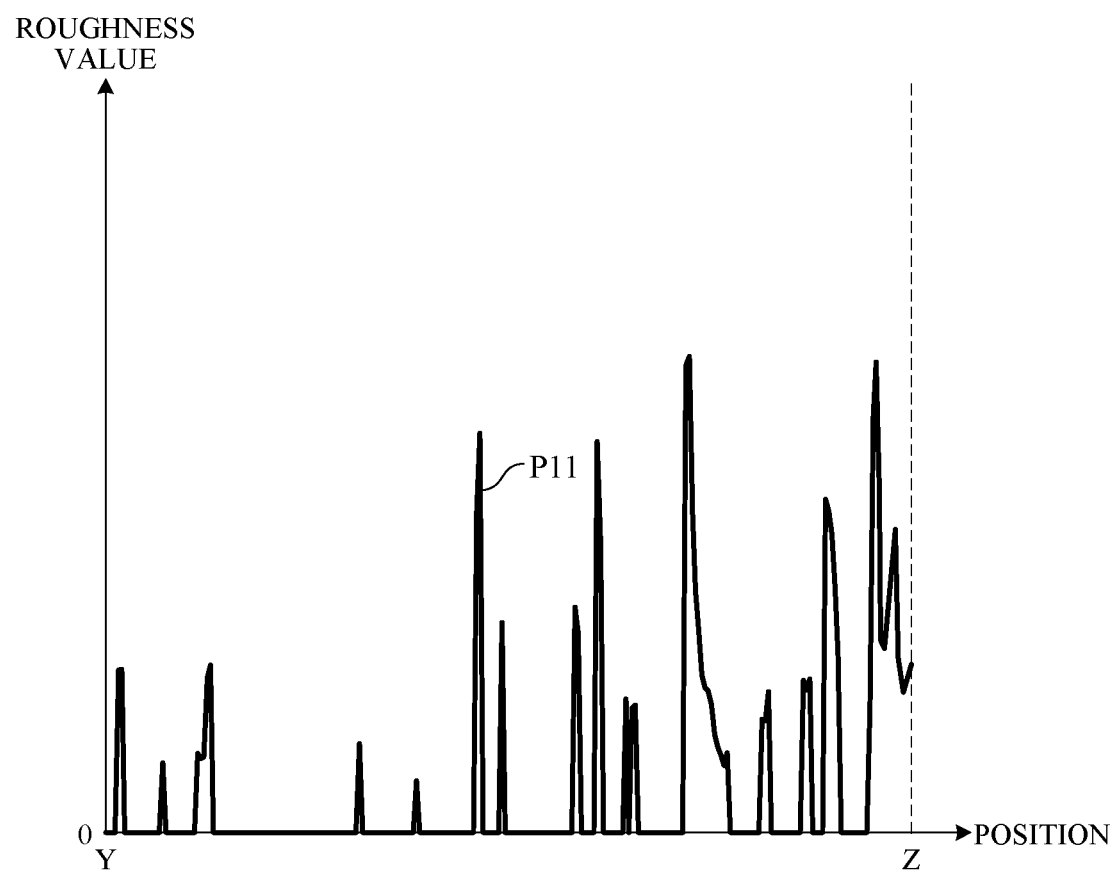
FIG. 8 is a diagram showing another example of road surface profile information.

By the way, when the degree of accumulation of driving information on the road to be evaluated (hereinafter referred to as degree of data accumulation) is low, it may not be possible to present road surface profile information to the user with sufficient accuracy. The degree of data accumulation is calculated based on the number of pieces of driving information acquired from the in-vehicle terminals 30 of a plurality of vehicles 20 that have traveled on the road to be evaluated within a predetermined period (for example, one month), and is expressed, for example, in terms of sampling frequency (Hz). FIG. 8 illustrates another example of road surface profile information. A characteristic P11 in the figure represents the road surface roughness value when there is a section for which no driving information has been acquired. As illustrated in FIG. 8, when there is a section on the road to be evaluated (latitude Y to Z on National Route X) for which no driving information has been acquired, the road surface roughness values in that section are not output. A section in which the road surface roughness value is 0 in the figure represents a section in which the driving information has not been acquired. As described above, when there is a section of the road to be evaluated for which driving information is not sufficiently acquired, road surface profile information is not properly presented, making it difficult for the user to estimate which roads need to be repaired.

Therefore, when the degree of accumulation of driving information of a plurality of vehicles 20 acquired by the information acquisition unit 111 within the predetermined period is less than the predetermined value, the road surface roughness evaluation unit 112 complements the driving information of the plurality of vehicles 20 acquired before the predetermined period to calculate the road surface roughness value.

Figure 9A:
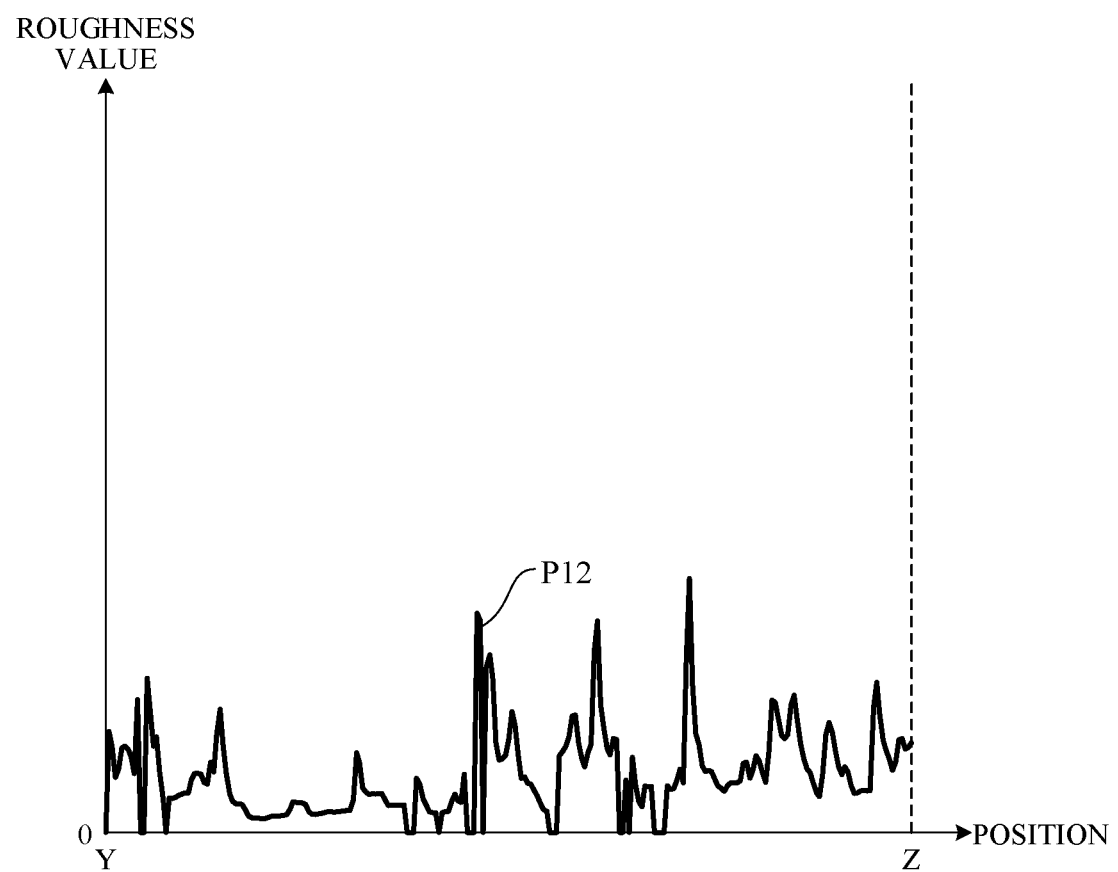
FIG. 9A is a diagram showing an example of the road surface profile information generated based on driving information acquired before a predetermined period.
Figure 9B:
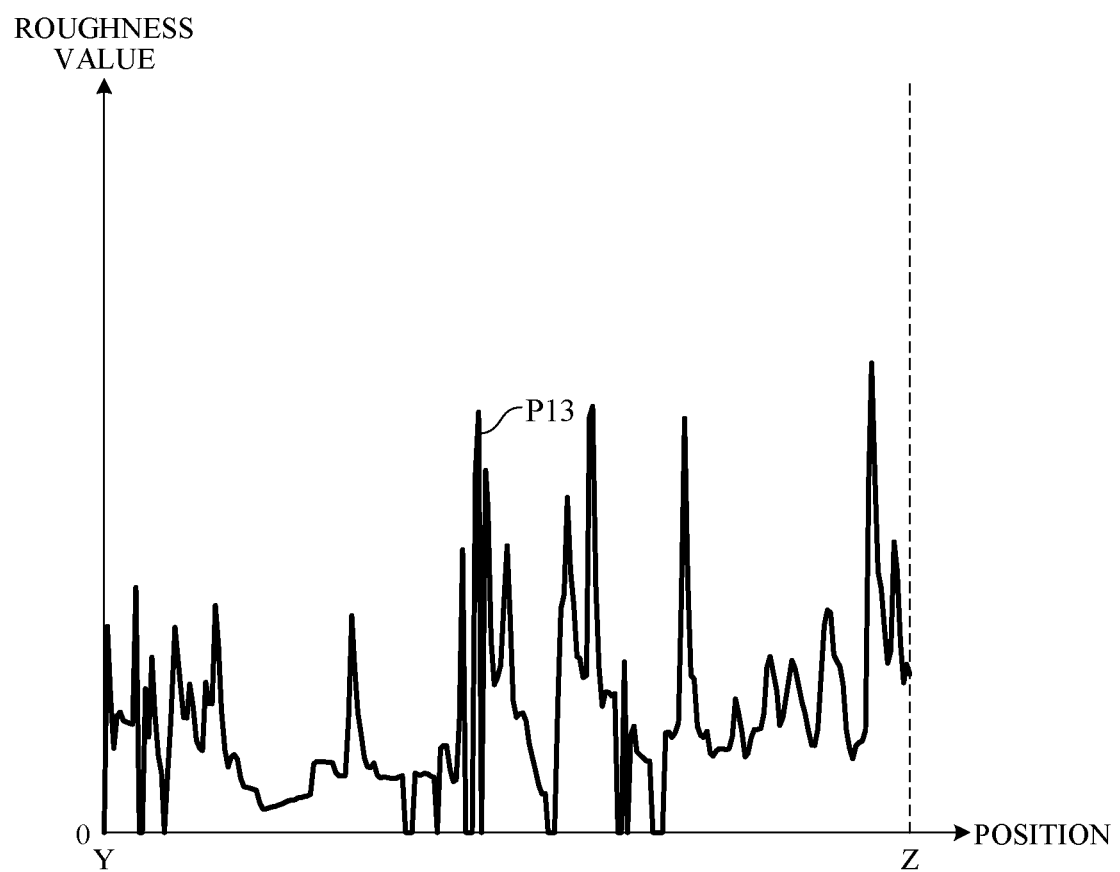
FIG. 9B is a diagram showing an example of the road surface profile information in FIG. 8 complemented with driving information acquired before the predetermined period.

FIG. 9A illustrates an example of road surface profile information generated based on driving information of a plurality of vehicles 20 acquired before the predetermined period. A characteristic P12 in the figure represents the road surface roughness value calculated based on the composite driving information acquired by combining the driving information of the plurality of vehicles 20 acquired before the predetermined period. FIG. 9B illustrates an example of the road surface profile information in FIG. 8 complemented with driving information of a plurality of vehicles 20 acquired before the predetermined period. A characteristic P13 in the figure represents the road surface roughness value calculated based on the composite driving information acquired by combining the driving information of the plurality of vehicles 20 acquired during the predetermined period on the road to be evaluated and the driving information of the plurality of vehicles 20 acquired before the predetermined period on the road to be evaluated. As illustrated in FIG. 9B, by complementing the driving information of a plurality of vehicles 20 acquired before the predetermined period on the road to be evaluated, road surface profile information can be presented with sufficient accuracy even when the degree of data accumulation on the road to be evaluated is low.

When the driving information of a plurality of vehicles 20 acquired before the predetermined period is complemented, the evaluation result output unit 113 generates information about the complemented driving information (hereinafter referred to as complementary information). The complementary information includes reliability information indicating the reliability of the roughness value of the road surface. The evaluation result output unit 113 calculates the reliability of the road surface roughness value based on the ratio of driving information acquired before the predetermined period included in the driving information used to generate the road surface profile information.

The evaluation result output unit 113 outputs the complementary information including the reliability information indicating the calculated reliability as part of the road surface profile information. Specifically, the evaluation result output unit 113 outputs the road surface profile information to be displayed in a manner according to the reliability indicated by the reliability information included in the complementary information. Specifically, when outputting a graph of road surface roughness values as illustrated in FIG. 9B to a display device, the evaluation result output unit 113 determines the color of the graph lines based on the complementary information and generates road surface profile information so that the graph is displayed in the determined color. For example, the road surface profile information is generated so that the graph is displayed in the first color when the reliability is less than the first threshold, in a second color different from the first color when the reliability is equal to or more than the first threshold and less than the second threshold, and in a third color different from the first and second colors when the reliability is equal to or more than the second threshold. The reliability may be classified into two or four or more levels, in which case the graph is color-coded according to the number of levels. In this manner, by outputting the complementary information as part of the road surface profile information, the user can recognize the reliability of the graph (road surface roughness values) displayed on the display device.

The communication control unit 114 controls a communication unit (not illustrated) to send and receive data to and from external devices and others. More specifically, the communication control unit 114 transmits and receives data via the communication network 2 to and from the in-vehicle terminals 30 of the vehicles 20 and terminals of road management companies or the like. The communication control unit 114 also receives output instructions for road surface profiles and degree of data accumulation sent from road management companies and other terminals via the communication network 2. In addition, the communication control unit 114 acquires map information and other information from various servers connected to the communication network 2 periodically or at arbitrary times. The communication control unit 114 then stores the information acquired from the various servers in the memory unit 120.

Figure 10:
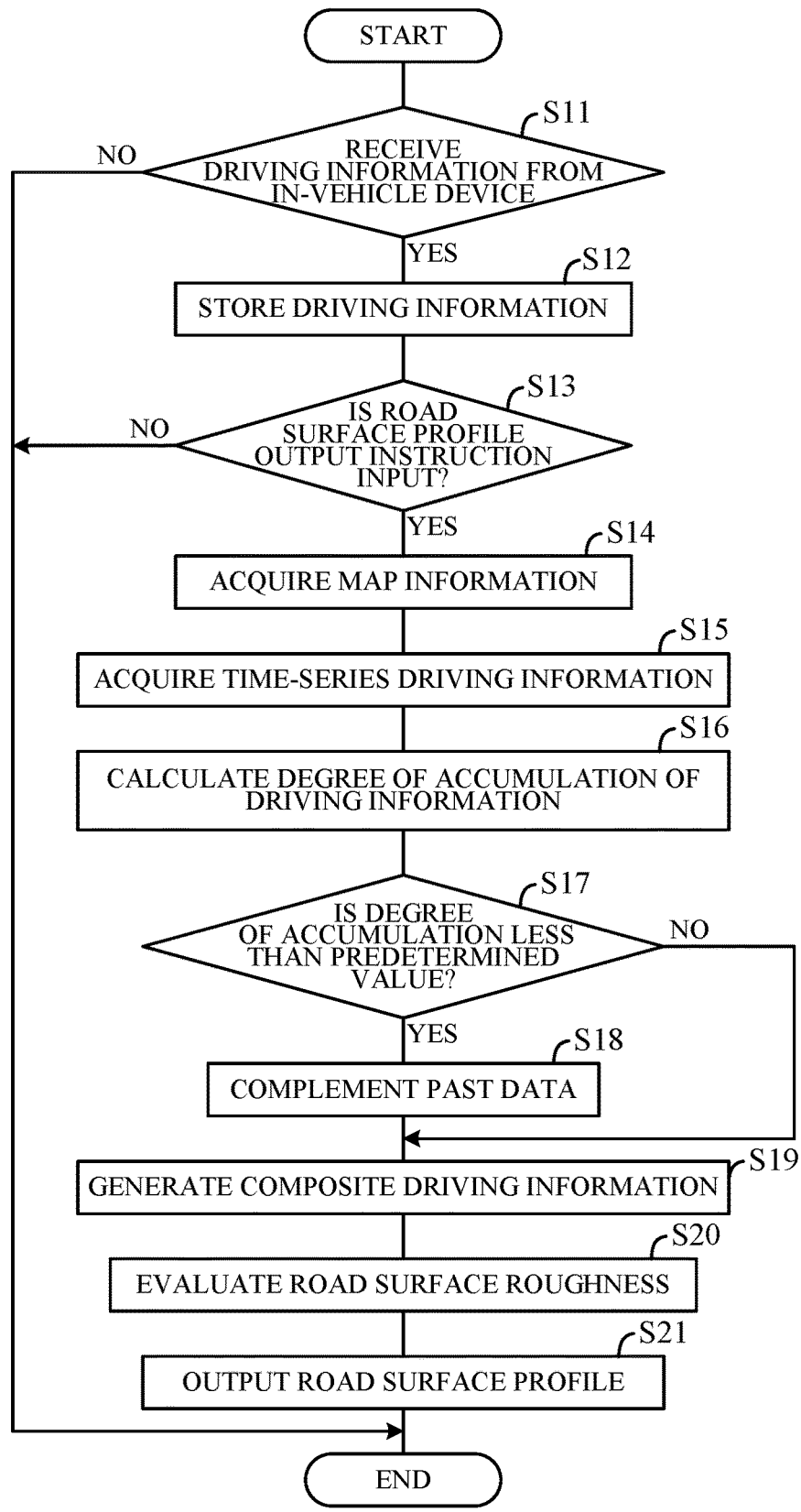
FIG. 10 is a flowchart illustrating an example of processing executed by the processing unit in FIG. 3.

FIG. 10 is a flowchart illustrating an example of processing executed by the processing unit 110 (CPU) of the road surface evaluation apparatus 10 according to a predetermined program. The processing illustrated in this flowchart is repeated at a predetermined period while the road surface evaluation apparatus 10 is running. First, in step S11, it is determined whether driving information has been received from the in-vehicle terminal 30 of the vehicle 20. If NO in step S11, the processing ends. In step S11, driving information may be received from the in-vehicle terminals 30 of a plurality of vehicles 20.

If YES in step S11, in step S12, the driving information received in step S11 is stored in the memory unit 120 together with the vehicle ID associated with the driving information. In step S13, it is determined whether or not a road surface profile output instruction has been input (received).

The road surface profile output instruction includes section information that can identify the road to be evaluated. The section information is information that indicates the name and section of the road to be evaluated, for example, "road: National Route X, section: latitude Y to Z". When the road has a plurality of lanes on each side, such as two lanes on one side, the section information may include information on the lane to be evaluated, such as "road: National Route X, lane: right end, section: latitude Y to Z". Information other than latitude may be used to specify the section to be output. For example, longitude may be used instead of latitude or in addition to latitude. Alternatively, the distance from the start point of the section may be used. The road surface profile output instruction further includes period information specifying a predetermined period to be evaluated. The period information includes information that can identify the period to be evaluated, for example, "one month from month M day D" or "within the past year from the present".

If NO in step S13, the processing ends. If YES in step S13, in step S14, map information is read from the memory unit 120 and road information included in the map information is acquired. In step S15, driving information of the vehicle 20 is acquired from the memory unit 120. More specifically, based on the section information and period information included in the road surface profile output instructions and the road information acquired in step S15, the driving information corresponding to the road to be evaluated identified by the section information and acquired during the predetermined period specified by the period information is read from the memory unit 120. At this time, when there is a plurality of the vehicles 20 that have traveled on the road to be evaluated within the specified predetermined period, the driving information corresponding to each of the vehicles 20 is read from the memory unit 120.

In step S16, the degree of data accumulation of the driving information acquired in step S15 is calculated. In step S17, it is determined whether the degree of data accumulation calculated in step S16 is less than a predetermined value. If NO in step S16, the processing proceeds to step S19. If YES in step S17, in step S18, the driving information corresponding to the road to be evaluated, which was acquired before the predetermined period specified by the period information, is read from the memory unit 120. The read-out driving information is then used to complement the driving information acquired in step S15. The road surface profile output instruction may include information specifying the driving information to be read from the memory unit 120 in step S18, such as "data within the past N months from the predetermined period".

In step S19, composite driving information is generated based on the driving information read from the memory unit 120 in step S15. At this time, when the driving information is complemented in step S18, composite driving information is generated based on the complemented driving information, that is, the driving information read from the memory unit 120 in steps S15 and S18. Next, in step S20, road surface roughness is evaluated based on the composite driving information generated in step S19.

Next, in step S21, the road surface roughness information (roughness value) evaluated in step S20 is associated with the road information acquired in step S14, that is, road surface profile information is generated and output. The reliability of the road surface roughness value is calculated based on the number of pieces of driving information acquired before the predetermined period specified by the period information, which is included in the driving information used to generate the road surface profile information. The road surface profile information is then generated so that a graph of road surface roughness values is displayed in a color corresponding to the calculated reliability. As a result, a graph of road surface roughness values can be displayed on a display or other display device in a color corresponding to the reliability.

According to the embodiment of the present invention, the following effects can be achieved.

(1) The road surface evaluation apparatus 10 includes: an information acquisition unit 111 that acquires driving information of each of a plurality of vehicles 20, including position information of the vehicles 20 while traveling and acceleration information indicating acceleration of the vehicles 20, as well as map information including road information on a road where the plurality of vehicles travel; a road surface roughness evaluation unit 112 that evaluates the road surface roughness (hereinafter also simply referred to as surface roughness) based on the acceleration information of the vehicles 20 acquired by the information acquisition unit 111 within a predetermined period and, when the degree of accumulation of the acceleration information of the vehicles 20 acquired within the predetermined period is less than a predetermined value, evaluates the road surface roughness by complementing the acceleration information of the vehicles acquired before the predetermined period; and an evaluation result output unit 113 that outputs the road surface roughness information evaluated by the road surface roughness evaluation unit 112 in association with the road information acquired by the information acquisition unit 111.

This configuration allows evaluation of road surface roughness based on driving information (acceleration information) transmitted from each of the vehicles 20, which are ordinary vehicles, and eliminates the need for dedicated vehicles to travel on the roads to be evaluated for road surface roughness. This allows efficient evaluation of the road surface profile of the roads on which the vehicles 20 have traveled. Furthermore, road surface profile information can be provided to the user with sufficient accuracy even when the number of vehicles have traveled within the section to be evaluated during the period to be evaluated is too small to evaluate the road surface roughness.

(2) When the acceleration information of the plurality of vehicles 20 acquired by the road surface roughness evaluation unit 112 before the predetermined period is complemented, the evaluation result output unit 113 outputs the complementary information about the complemented acceleration information in association with road information, together with the road surface roughness information. This allows the user to recognize whether or not acceleration information acquired prior to the period specified as the evaluation target was used to evaluate road surface roughness.

(3) The complementary information includes reliability information indicating the reliability of the road surface roughness information evaluated by the road surface roughness evaluation unit 112. The reliability is calculated by the evaluation result output unit 113 based on the ratio of the acceleration information of the plurality of vehicles 20 acquired before the predetermined period included in the acceleration information of the plurality of vehicles 20 used to evaluate road surface roughness by the road surface roughness evaluation unit 112. This configuration allows the user to accurately estimate the road that needs to be repaired even when road surface profile information is presented that is complemented with driving information acquired before the predetermined period. The unevenness of the road surface changes over time as vehicles travel on the road and as the road is repaired. Therefore, the road surface roughness information derived based on the acceleration information acquired before the predetermined period may differ from the road surface roughness information derived based on the acceleration information acquired during the predetermined period. Therefore, the evaluation result output unit 113 calculates the reliability so that the higher the above ratio, the lower the reliability.

(5) The information acquisition unit 111 acquires the driving information acquired in the first sampling period by the in-vehicle terminals 30 mounted on a plurality of vehicles 20. The road surface roughness evaluation unit 112 combines the driving information from the in-vehicle terminals 30 of each of the plurality of vehicles 20 acquired by the information acquisition unit 111 to generate a second sampling period of composite driving information, which is shorter than the first sampling period, and evaluates the road surface roughness based on the composite driving information. This allows accurate evaluation of road surface roughness without increasing the sampling period of driving information (lateral acceleration) in each of the vehicles 20.

(6) The information acquisition unit 111 further acquires correlation data indicating the correlation between the acceleration of the vehicles 20 and the road surface roughness. The road surface roughness evaluation unit 112 derives roughness information based on the correlation data obtained by the information acquisition unit 111. This allows more accurate evaluation of road surface roughness values.

(7) The evaluation result output unit 113 outputs the road surface profile information, which associates the roughness information derived by the road surface roughness evaluation unit 112 with the road information acquired by the information acquisition unit 111, in a displayable state. This allows the user to visually recognize the road surface profile and more easily estimate which roads need to be repaired.

The above embodiment can be modified into various forms. Hereinafter, modifications will be described.

Normally, even when a plurality of vehicles 20 travel on the same road, the road surface roughness values derived by the road surface roughness evaluation unit 112 may differ when the models or grades of the vehicles 20 are different. The reason for this is that the suspension, tires, and other components installed in the vehicles 20 that affect the vehicle's motion are different for each model and grade. In consideration of this point, in the present modification, the road surface roughness evaluation unit 112 corrects the lateral acceleration included in the driving information (acceleration information) of the vehicles 20 according to the models and grades of the vehicles 20, and then generates the composite driving information.

In general, the lower the shock-absorbing performance (vertical shock absorption performance) of the suspension and tires, the more easily shocks and vibrations caused by uneven road surfaces are transmitted to the vehicle, and the greater the lateral acceleration detected by the acceleration sensor 33 on the vehicles 20. Usually, the shock-absorbing performance of suspension and tires increases with the grade between the same models, and with the ride comfort between different models. This causes variation in the lateral acceleration detected in the vehicles 20, even when the vehicles 20 travel on the same road. As a result, road surface roughness value cannot be adequately evaluated.

Therefore, the information acquisition unit 111 identifies the models and grades of the vehicles 20 based on the vehicle ID (for example, VIN number) of the vehicles 20 associated with the driving information, and acquires the correction coefficients corresponding to the identified models and grades from the correction coefficient table described below. The correction coefficient table is stored in the memory unit 120 in advance. The road surface roughness evaluation unit 112 corrects the lateral acceleration indicated by the driving information (acceleration information) of the vehicles 20 using the correction coefficients acquired by the information acquisition unit 111.

FIG. 11 illustrates an example of a correction coefficient table. As illustrated in FIG. 11, the correction coefficient table stores unique information that includes information that can identify the types of predetermined components that constitute the vehicles and the correction coefficients corresponding to these types, in association with the models and grades of the vehicles. Predetermined components of the vehicles 20 are components that affect the motion of the vehicles 20 while traveling, such as suspension and tires. The types of components are, for example, the types of suspension distinguished by spring rate, etc., and the types of tire distinguished by flatness, width, and rubber hardness.

The correction coefficients are determined in advance by driving the vehicles 20 of different models and grades on a predetermined road (for example, road RD in FIG. 4A) and based on the ratio of accelerations detected by the acceleration sensors 33 of the vehicles 20 while traveling. In the example illustrated in FIG. 11, the correction coefficients for suspension are $\alpha 11$, $\alpha 12$, $\alpha 13$, and $\alpha 21$. Similarly, the correction coefficients for tires are $\beta 11$, $\beta 12$, $\beta 13$, and $\beta 21$. For example, when the model of a vehicle 20 is "ABC" and the grade is "low", the information acquisition unit 111 reads $\alpha 13$ as the correction coefficient for suspension and $\beta 13$ as the correction coefficient for tires from the correction coefficient table. The road surface roughness evaluation unit 112 multiplies those correction coefficients by the lateral acceleration indicated by the driving information (acceleration information) of the vehicle 20. The road surface roughness evaluation unit 112 thus corrects the acceleration contained in the driving information (acceleration information) of each of the vehicles 20, and then generates the composite driving information. This configuration allows the derivation of road surface profiles that can be adequately evaluated independent of the models of the vehicles 20 traveling on the road.

The acceleration sensor 33 may detect not only the lateral acceleration generated by the unevenness of the road surface when the vehicles 20 are traveling on a curve road, but also the lateral acceleration due to centrifugal force and roll motion generated by the speed and steering angle of the vehicles 20. That is, the lateral acceleration detected by the acceleration sensor 33 of the in-vehicle terminal 30 is a mixture of the lateral acceleration caused by the unevenness of the road surface and the lateral acceleration caused by the roll motion or centrifugal force of the vehicles 20.

Therefore, in order to derive road surface roughness values more accurately, the road surface roughness evaluation unit 112 may extract the lateral acceleration caused by road surface unevenness from the lateral acceleration of the vehicles 20 indicated by the acceleration information, by removing the lateral acceleration caused by the roll motion and centrifugal force of the vehicles 20.

Specifically, first, the road surface roughness evaluation unit 112 acquires information on the vehicle speed detected by the vehicle speed sensor 35 and the steering angle detected by the steering angle sensor 34 from the driving information of the plurality of vehicles 20. The road surface roughness evaluation unit 112 estimates the roll angle and centrifugal force of the vehicle 20 using the acquired information on vehicle speed and steering angle. The road surface roughness evaluation unit 112 applies a filter (variable filter) according to the estimated roll angle and centrifugal force of the vehicles 20 to the composite driving information to remove the component of lateral acceleration caused by the roll motion or centrifugal force of the vehicles 20 from the composite driving information.

Figure 12A:
FIG. 12A is a diagram showing an example of the composite driving information before a variable filter is applied.
Figure 12B:
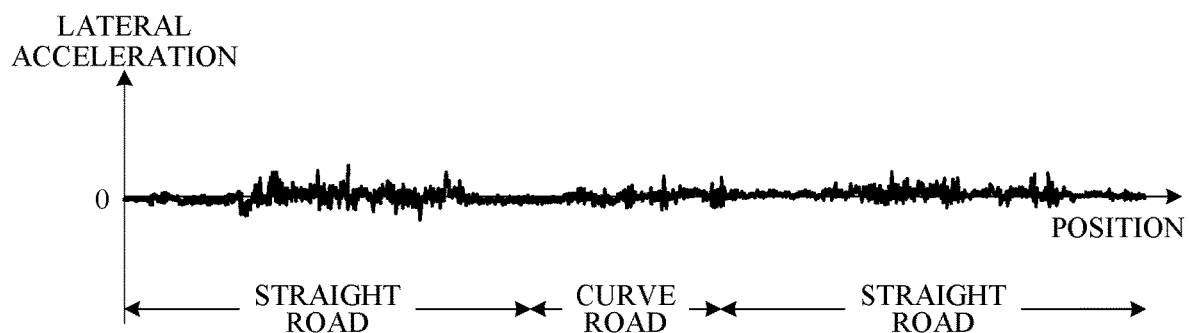
FIG. 12B is a diagram showing an example of the composite driving information after the variable filter is applied.

FIG. 12A illustrates an example of composite driving information before a variable filter is applied. As illustrated in FIG. 12A, the lateral acceleration on a curve road has a larger value than that on a straight road because it includes more lateral acceleration caused by the roll motion or centrifugal force of the vehicle 20. FIG. 12B illustrates an example of the composite driving information in FIG. 12A after a variable filter is applied. By removing the component of lateral acceleration caused by roll motion or centrifugal force from the composite driving information using a variable filter, the composite driving information illustrated in FIG. 12B is acquired. The road surface roughness evaluation unit 112 derives the road surface roughness value based on the composite driving information from which the component of lateral acceleration caused by roll motion or centrifugal force is removed and the correlation between the road surface roughness value and lateral acceleration. This allows accurate evaluation of the road surface profile of the road on which the vehicles 20 have traveled, even when evaluating road surface roughness on roads with a mixture of straight and curved portions.

In the above embodiment, the position information acquired by the position measurement sensor 32 (GPS sensor) is transmitted to the road surface evaluation apparatus 10, but the position information acquired by inertial navigation may be transmitted to the road surface evaluation apparatus 10 as position information. Specifically, in addition to each of the above sensors 32 to 35, the in-vehicle terminal 30 may include a gyro sensor to detect angular velocity and a travel distance sensor to detect trip distance. The processing unit 310 may then estimate the position of the vehicle 20 by inertial navigation using the values detected by the gyro sensor and the travel distance sensor. That is, the processing unit 310 may determine the vehicle position using a hybrid method with inertial navigation. This allows accurate recognition of the position of each vehicle 20, which allows more accurate evaluation of road surface roughness. The in-vehicle terminal 30 (processing unit 310) may estimate the position of the vehicle 20 based on the travel distance detected by the travel distance sensor.

In the above embodiment, the evaluation result output unit 113 calculated the reliability based on the ratio of acceleration information acquired before the predetermined period included in the acceleration information used to evaluate road surface roughness. However, the evaluation result output unit 113 may calculate the reliability based on the detection time of acceleration information acquired before the predetermined period. At that time, when there is a plurality of pieces of acceleration information acquired before the predetermined period, the evaluation result output unit 113 calculates the reliability based on the detection time acquired by averaging the detection times of the plurality of pieces of acceleration information. The evaluation result output unit 113 calculates the reliability information so that the older the detection time, the lower the reliability. The detection time is a time point when the sensor value included in the driving information, which is identified from the detection time information accompanying the driving information, is detected. The time point when the driving information received by the information acquisition unit 111 from the vehicles 20 (in-vehicle terminals 30) is stored in the memory unit 120 may be considered as the detection time of the driving information.

In the above embodiment, the road surface roughness evaluation unit 112 estimated the roll angle and centrifugal force of the vehicle 20 based on the vehicle speed detected by the vehicle speed sensor 35 and the steering angle detected by the steering angle sensor 34. However, the in-vehicle terminal 30 may have a sensor that detects the roll angle of the vehicle 20 and a sensor that detects centrifugal force, and the communication control unit 312 may include the roll angle and centrifugal force information detected by those sensors in the driving information and transmit it to the road surface evaluation apparatus 10.

In the above embodiment, the road surface roughness values are expressed in terms of IRI, but the road surface roughness values may be expressed in terms of other indices. When the road surface roughness value obtained as teacher data is expressed by an index other than IRI, the road surface roughness evaluation unit 112 may derive the road surface roughness value expressed by that index.

In the above embodiment, the first sampling period (1 Hz) of driving information transmitted from n vehicles 20 was combined to generate the second sampling period (1×n Hz) of composite driving information. However, the method of generating composite driving information is not limited to this. For example, the vehicles 20 with similar vehicle speeds (for example, within 10 km/h difference in average speed) may be extracted from n vehicles 20, and the driving information of the extracted vehicles 20 may be combined to generate composite driving information. As described above, by generating the composite driving information excluding the driving information of the vehicles 20 having extremely different vehicle speeds, a more accurate road surface roughness value can be derived, allowing more accurate evaluation of road surface roughness. For example, the driving information of each vehicle 20 may be corrected according to the vehicle speed of each vehicle 20 before generating the composite driving information. Even when the vehicles 20 travel on the same road, the lateral acceleration of the vehicles 20 detected by the acceleration sensor 33 varies depending on the vehicle speed during traveling. More specifically, this is because the greater the vehicle speed during traveling, the harder it is for the tires of the vehicle 20 to follow the road surface, and the smaller the lateral acceleration detected by the acceleration sensor 33. Therefore, the composite driving information may be generated after multiplying the driving information of each of the vehicles 20 by a correction factor such that the greater the vehicle speed (average vehicle speed) of the vehicles 20, the larger the value.

In the above embodiment, the information acquisition unit 111 acquires the lateral acceleration of the vehicles 20 detected by the acceleration sensor 33 as information indicating the motion of the vehicles 20 as the driving information acquisition unit, but the information indicating the motion of the vehicles 20 is not limited to the lateral acceleration of the vehicles 20 detected by the acceleration sensor 33. That is, the configuration of the information acquisition unit 111 may be any configuration, such as detecting front/rear acceleration, as long as it acquires information indicating the motion of the vehicle 20.

In the above embodiment, the information acquisition unit 111 functions as a map information acquisition unit to acquire map information from the memory unit 120, including road information on which the vehicles 20 are traveling, but the map information may be stored on an external server or external storage device. In other words, any configuration of the information acquisition unit 111 may be used as long as it acquires map information that includes information on the road on which the vehicles 20 are traveling.

In the above embodiment, the information acquisition unit 111 functions as a unique information acquisition unit to acquire unique information including correction coefficients from the correction coefficient table stored in the memory unit 120, but the correction coefficient table may be stored on an external server or external storage device. The information acquisition unit 111 may then acquire the correction factor table from an external server or other source via the communication control unit 114.

In the above embodiment, the road surface roughness evaluation unit 112 functions as a correlation data acquisition unit to acquire correlation data between road surface roughness values and lateral acceleration by machine learning using pre-measured road surface roughness values and lateral acceleration as teacher data. However, the correlation between road surface roughness values and lateral acceleration may be derived in advance from the teacher data of road surface roughness values and lateral acceleration, and the derived information (correlation data) may be stored in the memory unit 120 or an external server. The information acquisition unit 111 may then act as the correlation data acquisition unit to acquire correlation data stored in the memory unit 120 and others.

In the above embodiment, the evaluation result output unit 113 functions as an output unit to output road surface profile information, but the evaluation result output unit 113 may output other information. For example, when there is a road (section) where the degree of accumulation of driving information is less than a predetermined value, the evaluation result output unit 113 may output, via the communication control unit 114, traveling request information that requests the vehicles 20 to travel on that road. In this case, the evaluation result output unit 113 may output the traveling request information not to all vehicles 20, but to the vehicles 20 within a predetermined distance (for example, within 1 km) from the road where the degree of accumulation of driving information is less than a predetermined value. Incentives such as discount coupons (electronic coupons) that can be used for certain services may be given to the users of the vehicles 20 that have traveled on the roads specified in response to the traveling request information. Accordingly, it is expected that the road surface roughness can be more accurately evaluated.

Furthermore, in the above embodiment, the road surface roughness evaluation unit 112 uses correlation data to derive the road surface roughness value corresponding to the vehicle position on the road from the lateral acceleration, but the road surface roughness value may be derived by other methods. For example, a parameter for calculating the road surface roughness value may be derived from the previously measured road surface roughness value and lateral acceleration, and the derived parameter may be stored in the memory unit 120. In that case, the road surface roughness evaluation unit 112 calculates the road surface roughness value corresponding to the vehicle position on the road from the lateral acceleration using the above parameter stored in the memory unit 120.

The present invention can also be used as a road surface evaluation method including executing the following steps with a computer: acquiring driving information of each of the plurality of vehicles 20, including position information of the plurality of vehicles 20 while traveling and acceleration information indicating the acceleration of the plurality of vehicles 20 (S15); acquiring map information including road information on a road where the plurality of vehicles travel (S14); evaluating road surface roughness based on the acceleration information of the plurality of vehicles 20 acquired within a predetermined period, and when the degree of accumulation of the acceleration information of the plurality of vehicles 20 acquired within the predetermined period is less than a predetermined value, complementing the acceleration information of the plurality of vehicles 20 acquired before the predetermined period to evaluate the road surface roughness (S16 to S20); and outputting the evaluated road surface roughness information in association with the road information (S21).

The above embodiment can be combined as desired with one or more of the above modifications. The modifications can also be combined with one another.

The present invention allows efficient evaluation of road surface profiles.

Above, while the present invention has been described with reference to the preferred embodiments thereof, it will be understood, by those skilled in the art, that various changes and modifications may be made thereto without departing from the scope of the appended claims.

What is claimed is:

1. A road surface evaluation apparatus, comprising:
a microprocessor and a memory connected to the microprocessor, wherein
the microprocessor is configured to perform:
acquiring driving information of each of a plurality of vehicles, including a position and an acceleration of each of the plurality of vehicles while traveling, and map information including road information on a road where the plurality of vehicles travel;
evaluating a surface roughness of the road based on accelerations of the plurality of vehicles within a predetermined period and, when a degree of accumulation of the accelerations of the plurality of vehicles acquired within the predetermined period is less than a predetermined value, evaluating the surface roughness by complementing the acceleration of the plurality of vehicles acquired before the predetermined period; and
outputting information on the surface roughness in association with the road information, wherein
the microprocessor is configured to perform
the outputting including, when the accelerations of the plurality of vehicles acquired before the predetermined period is complemented in the evaluating, outputting complementary information on the accelerations of the plurality of vehicles after complementing in association with the road information, together with the information on the surface roughness.

2. The road surface evaluation apparatus according to claim 1, wherein
the complementary information includes a reliability of the information on the surface roughness, and
the microprocessor is configured to perform the outputting including calculating the reliability based on a ratio of accelerations of the plurality of vehicles acquired before the predetermined period included in the accelerations of the plurality of vehicles used to evaluate the surface roughness.

3. The road surface evaluation apparatus according to claim 2, wherein
the microprocessor is configured to perform
the outputting including calculating the reliability based on a detection time of accelerations of the plurality of vehicles acquired before the predetermined period.

4. The road surface evaluation apparatus according to claim 1, wherein
the microprocessor is configured to perform
the acquiring including acquiring the driving information acquired at a first sampling period by in-vehicle terminals mounted on the plurality of vehicles, and
the evaluating including combining the driving information from the in-vehicle terminals of the plurality of vehicles to generate composite driving information of a second sampling period which is shorter than the first sampling period, and evaluating the surface roughness based on the composite driving information.

5. The road surface evaluation apparatus according to claim 1, wherein
the driving information includes at least one of positions of the plurality of vehicles acquired by position measurement sensors mounted in the plurality of vehicles and positions of the plurality of vehicles acquired by inertial navigation.

6. The road surface evaluation apparatus according to claim 1, wherein
the accelerations of the plurality of vehicles included in the driving information are the accelerations of the plurality of vehicles in left-right directions,
the driving information includes roll motions or centrifugal forces of the plurality of vehicles, and
the microprocessor is configured to perform
the evaluating including performing a correction for removing effect of the roll motions and centrifugal forces of the plurality of vehicles from the accelerations of the plurality of vehicles to evaluate the surface roughness based on the accelerations of the plurality of vehicles after the correction.

7. The road surface evaluation apparatus according to claim 1, wherein
the microprocessor is configured to further perform
acquiring correlation data indicating a correlation between the accelerations of the plurality of vehicles and the surface roughness, and
the microprocessor is configured to perform
the evaluating including deriving the information on the surface roughness based on the correlation data.

8. The road surface evaluation apparatus according to claim 1, wherein
the microprocessor is configured to further perform
acquiring unique information identifiable types of predetermined components included in the plurality of vehicles, and
the microprocessor is configured to perform
the evaluating including correcting the accelerations of the plurality of vehicles based on the unique information to evaluate the surface roughness based on the accelerations of the plurality of vehicles after the correcting.

9. The road surface evaluation apparatus according to claim 1, wherein
the microprocessor is configured to perform
the outputting including outputting in a displayable manner road surface profile information associating the information on the surface roughness with the road information.

10. The road surface evaluation apparatus according to claim 2, wherein
the microprocessor is configured to perform the outputting including outputting in a displayable manner road surface profile information associating the information on the surface roughness with the road information, and
the information on the road surface profile information is output so as to display in a manner according to the reliability included in the complementary information.

* * * * *